United States Patent
Tamimi et al.

(10) Patent No.: US 6,956,471 B2
(45) Date of Patent: Oct. 18, 2005

(54) HYBRID TIRE INFLATION MONITOR

(75) Inventors: Mohammad A. Tamimi, Southfield, MI (US); Deron C. Littlejohn, West Bloomfield, MI (US); Bryan T. Fulmer, Byron, MI (US)

(73) Assignee: Delphi Technologies, Inc., Troy, MI (US)

( * ) Notice: Subject to any disclaimer, the term of this patent is extended or adjusted under 35 U.S.C. 154(b) by 254 days.

(21) Appl. No.: 10/417,065

(22) Filed: Apr. 16, 2003

(65) Prior Publication Data

US 2004/0207518 A1 Oct. 21, 2004

(51) Int. Cl.[7] .............................................. B60C 23/00
(52) U.S. Cl. ..................... 340/442; 340/444; 340/913; 340/447; 340/449; 701/69
(58) Field of Search ................................ 340/442, 444, 340/443, 449, 440, 913, 454, 438, 446, 445, 447; 701/69, 80

(56) References Cited

U.S. PATENT DOCUMENTS

| | | | | |
|---|---|---|---|---|
| 4,574,267 A | * | 3/1986 | Jones | 340/443 |
| 4,825,368 A | * | 4/1989 | Itoh et al. | 701/69 |
| 5,218,862 A | * | 6/1993 | Hurrell et al. | 73/146.5 |
| 5,721,374 A | * | 2/1998 | Siekkinen et al. | 73/146.2 |
| 5,721,528 A | | 2/1998 | Boesch et al. | |
| 6,002,327 A | | 12/1999 | Boesch et al. | |
| 6,222,444 B1 | * | 4/2001 | Wang | 340/442 |
| 6,285,280 B1 | | 9/2001 | Wang | |
| 6,340,930 B1 | | 1/2002 | Lin | |
| 6,472,979 B2 | | 10/2002 | Schofield et al. | |
| 6,486,771 B1 | | 11/2002 | Fuller et al. | |
| 6,549,842 B1 | * | 4/2003 | Hac et al. | 701/80 |
| 6,731,205 B2 | * | 5/2004 | Schofield et al. | 340/444 |

\* cited by examiner

*Primary Examiner*—Jeffery Hofsass
*Assistant Examiner*—Daniel Previl
(74) *Attorney, Agent, or Firm*—Michael D. Smith

(57) ABSTRACT

The present invention provides a method, a computer usable medium including a program, and a system for monitoring inflation in a plurality of vehicle tires. The method and computer usable medium include the steps of determining a direct pressure in at least one primary tire and determining a rolling radius for the primary tire and at least one secondary tire. A pressure difference is determined based on the determined rolling radius for the primary and secondary tires. The determined pressure difference is adjusted based on the determined direct pressure of the primary tire. The determined pressure difference is compared to at least one threshold value. The system includes means for achieving the method steps of the invention.

20 Claims, 4 Drawing Sheets

| | | |
|---|---|---|
| WHEN TIRE INFLATION STATUS WITHIN A NORMAL PRESSURE RANGE | "NORMAL" INDICATION | 150 |
| WHEN TIRE INFLATION STATUS IS ABOVE A NORMAL PRESSURE RANGE | "OVER-INFLATION" INDICATION | 151 |
| WHEN TIRE INFLATION STATUS IS BELOW A NORMAL PRESSURE RANGE | "LOW" INDICATION | 152 |
| WHEN TIRE INFLATION STATUS IS FAR BELOW A NORMAL PRESSURE RANGE | "FLAT" INDICATION | 153 |

FIG. 4

HYBRID TIRE INFLATION MONITOR

TECHNICAL FIELD OF THE INVENTION

The present invention relates generally to vehicular tires. More particularly, the invention relates to a hybrid tire inflation monitor.

BACKGROUND OF THE INVENTION

It is desirable for the tires of a motor vehicle to remain properly inflated. When the tires of a motor vehicle are under-inflated or "low", the tire rolling resistance increases and therefore the vehicle's fuel economy decreases. In addition, the vehicle's handling characteristics, such as steering and braking, may be adversely affected. Low tires also experience greater flexing than properly inflated tires, leading to excessive wear and a decrease in usable tire life. Accordingly, tire inflation should be monitored to ensure proper inflation levels.

To ensure proper tire inflation levels, numerous monitoring strategies have been developed. Such strategies include those that directly measure tire pressure or utilize effective rolling radius calculations to determine when the radius of one of the wheels varies. The generally employed principle of using the effective rolling radius relies on the fact that a wheel with a flat or low pressure tire has an incrementally smaller effective rolling radius than a properly inflated tire. Often, sensors are used to measure the rotation of each wheel wherein sensor measurements are related to the effective rolling radius. The tire inflation level may be determined based on the effective rolling radius.

For radial construction tires, the effective rolling radius may be weakly dependent on tire pressure. Therefore, determining tire inflation for radial construction tires is more difficult. A large "hoop tension" in the tire belt keeps the tire rolling radius almost constant with respect to tire inflation. For example, some tests indicate that a tire inflated to only 3 pounds per square inch (psi) may have a rolling radius approximately 0.9% smaller than if it were inflated to its nominal pressure, 30 psi. However, very accurate measurement of rolling radius has become economically feasible due to the enhanced dynamic range of modern 16-bit microprocessors commonly used in Anti-lock Braking Systems (ABS) and which read the wheel rotation sensors.

Another challenge in monitoring tire inflation by rolling radius relates to the fact that some tire characteristics have a larger influence upon wheel effective rolling radius than inflation pressure. Tire-to-tire manufacturing tolerances may vary the effective rolling radius by up to 0.4%. Also, during the tire break-in period, approximately the first 100 miles, the effective rolling radius typically may change up to 0.6%. Tread wear may also significantly change the effective rolling radius over the tire lifetime, up to 0.5%.

Vehicle operating conditions may also offset the effective rolling radius determinations of tire inflation status. These conditions are those which cause wheel slippage, those related to the use of a "space-saver" spare tire, and those related to speed. Generally speaking, maneuvers that result in even slight to moderate wheel slippage may cause the effective rolling radius to change by an amount greater than that to be caused by pressure variation alone. Such maneuvers include accelerating, decelerating using brakes, steering through sharp turns, and any combinations of these.

Vehicle operation at very low speeds (e.g., less than about 6 mph or 10 kph) may also offset the effective rolling radius determinations of tire inflation status. One reason is an increased likelihood of wheel slip due to acceleration, deceleration, and steering. This is because low speed operation is not a sustained operating point, but a transitional one during which the car is decelerating to stop, accelerating to normal driving speeds, or steering through sharp turns and corners. Also, at low speeds, the wheel rotation sensor signal drops to a very low amplitude level and may become "noisy" or nonexistent. The loss of signal integrity at low speed is a characteristic of the most widely used wheel rotation sensor technology. Therefore, it would be desirable to overcome many of the aforementioned disadvantages associated with monitoring tire inflation based on determinations of rolling radius.

To overcome some of the shortcomings associated with using rolling radius based determinations, sensors may be used to directly measure tire pressure of each tire. The direct pressure sensors may provide an effective alternative strategy for monitoring tire inflation as they are not subject to many of the factors that can offset determinations based on rolling radius. Although such sensors may facilitate accurate tire inflation monitoring, providing a sensor for each vehicle tire increases the cost of the monitoring system. Accordingly, it would be desirable to provide a strategy for monitoring tire inflation without the need for a sensor at each vehicle tire.

Therefore, it would be desirable to provide a strategy for monitoring vehicle tire inflation that overcomes the aforementioned and other disadvantages.

SUMMARY OF THE INVENTION

A first aspect of the present invention provides a method of monitoring inflation in a plurality of vehicle tires. The method includes determining a direct pressure in at least one primary tire and determining a rolling radius for the primary tire and a secondary tire. A pressure difference is determined based on the determined rolling radius for the primary and secondary tires. The determined pressure difference is adjusted based on the determined direct pressure of the primary tire. The determined pressure difference is compared to at least one threshold value.

A second aspect of the invention provides a computer usable medium including a program for monitoring inflation in a plurality of vehicle tires. The computer usable medium includes computer readable program code for determining a direct pressure in at least one primary tire, for determining a rolling radius for the primary tire and a secondary tire, and for determining a pressure difference based on the determined rolling radius for the primary and secondary tires. The computer usable medium further includes computer readable program code for adjusting the determined pressure difference based on the determined direct pressure of the primary tire, and for comparing the determined pressure difference to at least one threshold value.

A third aspect of the invention provides a system for monitoring inflation in a plurality of vehicle tires. The system includes means for determining a direct pressure in at least one primary tire, means for determining a rolling radius for the primary tire and a secondary tire, and means for determining a pressure difference based on the determined rolling radius for the primary and secondary tires. The determined pressure difference is adjusted based on the determined direct pressure of the primary tire. The determined pressure difference is compared to at least one threshold value.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

BRIEF DESCRIPTION OF THE DRAWINGS

FIG. 4 is a diagram depicting operation of a tire status indicator in accordance with the present invention

DESCRIPTION OF THE PRESENTLY PREFERRED EMBODIMENTS

Figure 1:
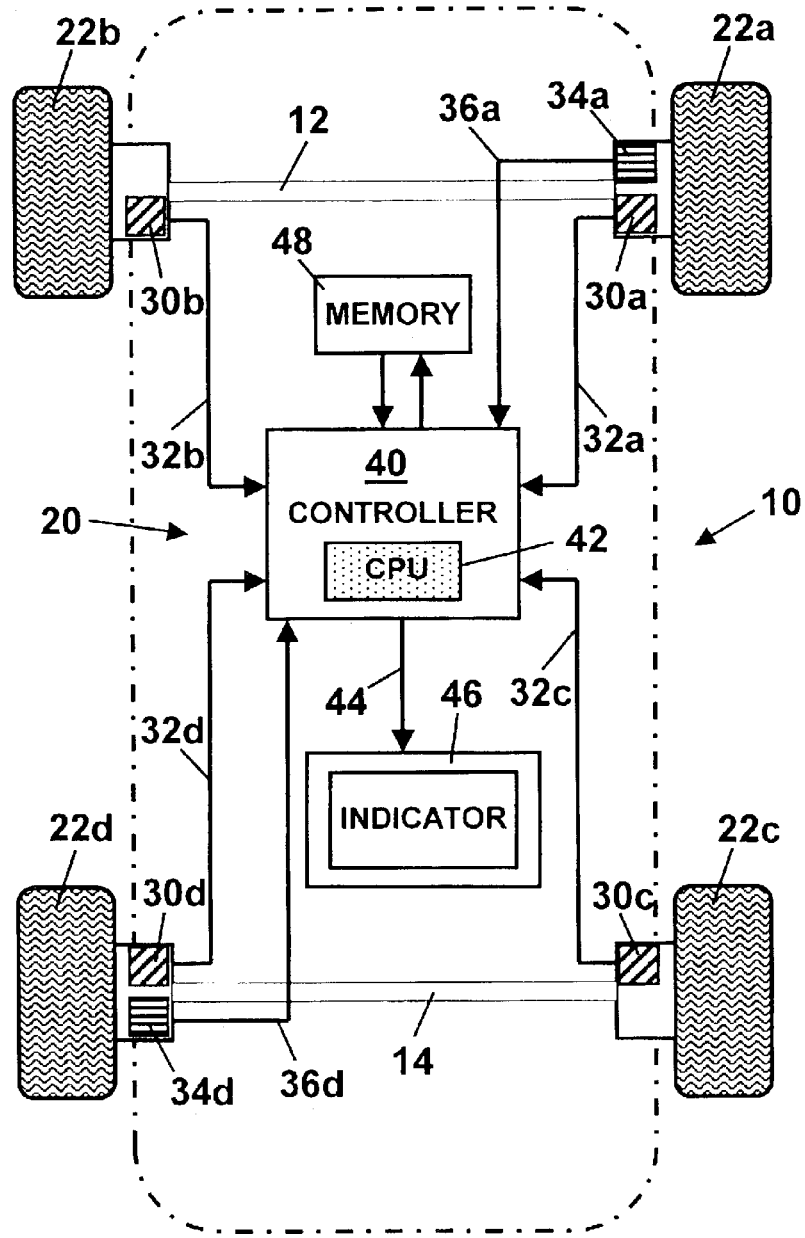
FIG. 1 is a schematic view of a vehicle including a tire inflation monitoring system in accordance with the present invention.

Referring to the drawings, wherein like reference numerals refer to like elements, FIG. 1 is a schematic view of a vehicle, shown generally by numeral 10, including a hybrid tire inflation monitoring system 20 in accordance with the present invention. Those skilled in the art will recognize that the vehicle 10 and tire inflation monitoring system 20 may include a number of alternative designs and may be employed in a variety of applications. In the present description and figures, the vehicle 10 includes four wheel assemblies including conventional pneumatic tires 22a, 22b, 22c, 22d and the tire inflation monitoring system 20 for monitoring the inflation status thereof.

Each tire 22a, 22b, 22c, and 22d may include a sensor 30a, 30b, 30c, 30d that provides an output signal, represented by lines 32a, 32b, 32c, 32d indicative of the relative rotation of that tire 22a, 22b, 22c, 22d. Sensor 30a, 30b, 30c, 30d outputs may be used to determine a rolling radius for each individual tire 22a, 22b, 22c, 22d of the vehicle 10. Suitable tire rotation sensors 30a, 30b, 30c, 30d are known to, or can be constructed by, those skilled in the art. Numerous alternative types of rotation and velocity sensors, including transformer type sensors, may be adapted for use with the present invention.

In one embodiment of the present invention, vehicle 10 may include front and rear axles 12, 14, each having two tires 22a, 22b, 22c, 22d. A sensor 34a, 34d may be operably coupled to at least one tire 22a, 22b, 22c, 22d of each axle 12, 14. Sensor 34a, 34d may be an inflation pressure sensor as known in the art for providing an output signal 36a, 36d indicative of tire 22a, 22b, 22c, 22d direct pressure. Each sensor 30a, 30b, 30c, 30d, 34a, 34d may further include an internal circuit board with a buffer circuit for buffering the output signal 32a, 32b, 32c, 32d, 36a, 36d and providing a buffered signal to a tire inflation monitoring controller 40. In an alternative embodiment, a single tire pressure sensor may be provided as part of the hybrid tire inflation monitoring system to monitor tire inflation status of a plurality of, in this case all four, tires. For example, the front right tire may include the pressure sensor whereas the front left, right rear, and left rear tires may not include the pressure sensor.

The inflation pressure of the tires 22a, 22b, 22c, 22d may be related to the tire radius in that, to an extent, increasing the tire pressure increases the radius. Further, tire radius may be related to tire rotation speed in that, for a given vehicle speed, the tire rotation speed will increase as the tire radius decreases. Accordingly, by relating the speed of the vehicle tires to each other, all of which are subject to a common vehicle speed, information on the tire radius and thus on the individual tire inflation pressure may be determined.

Vehicles are currently available that include the necessary hardware for constant monitoring of each of the vehicle's tires. Accordingly, to implement a strategy that determines tire pressure status on tire speed information (i.e., via a rolling radius determination) may be relatively inexpensive, as generally only an algorithm to interpret the already available tire speed data, and optionally a pressure status indicating means is needed. Unfortunately, tire speed information can indicate things other than deviations in tire pressure. For instance, tire speed variations may be experienced when the vehicle is turning, is accelerating or decelerating, is going up or down steep grades, when at least one of the vehicle wheels is slipping, or when there is a cross-wind bearing in the vehicle.

These "external factors", unless properly accounted for, may compromise the accuracy of the inflation monitoring system, and may cause false indications of low tire pressure. Furthermore, idiosyncrasies in the vehicle itself may bias the individual tire speed values, increasing the potential for false indications of pressure loss. Such biases are typically difficult to account for, for instance by a predetermined model of vehicle behavior, as the biases are often vehicle specific, and may change in unpredictable ways throughout the life of the vehicle. In response to these factors, the present invention may overcome many of the shortcomings associated with tire inflation monitoring based on rolling radius determinations. As described below, compensation for these factors is achievable with a hybrid tire inflation monitoring strategy.

In one embodiment, controller 40 may processes signals 32a, 32b, 32c, 32d to determine an effective rolling radius for each tire 22a, 22b, 22c, 22d and signal 36a, 36d to determine a direct pressure for at least one tire 22a, 22d per axle 12, 14. Output signals 32a, 32b, 32c, 32d, 36a, 36d may be relayed to the controller 40 by a variety of means known in the art, such as a radio frequency transmission or by coupled wire. Controller 40 may be a digital microprocessor 42 programmed to process a plurality of input signals in a stored algorithm and generate output signals 44, some of which may be relayed to a tire inflation indicator 46. The methods, algorithms, and determinations (e.g., calculations and estimations) of the present invention, including those based on equations or value tables, may be performed by a device such as the microprocessor 42.

Controller 40 may receive input, perform determinations, and provide output for indicating an inflation status of each tire 22a, 22b, 22c, 22d through the indicator 46 or other indication means. Furthermore, any computer usable medium and value tables associated with the present invention may be programmed or read into a microprocessor memory portion 48 (e.g., ROM, RAM, and the like) for executing algorithms (e.g., a program) associated with the present invention. Analog signal processing may be provided for some of the input signals. For example, signals from the sensors 30a, 30b, 30c, 30d, 34a, 34d may be filtered to eliminate signal "noise" that may serve to offset the determination of tire inflation status.

Figure 2:
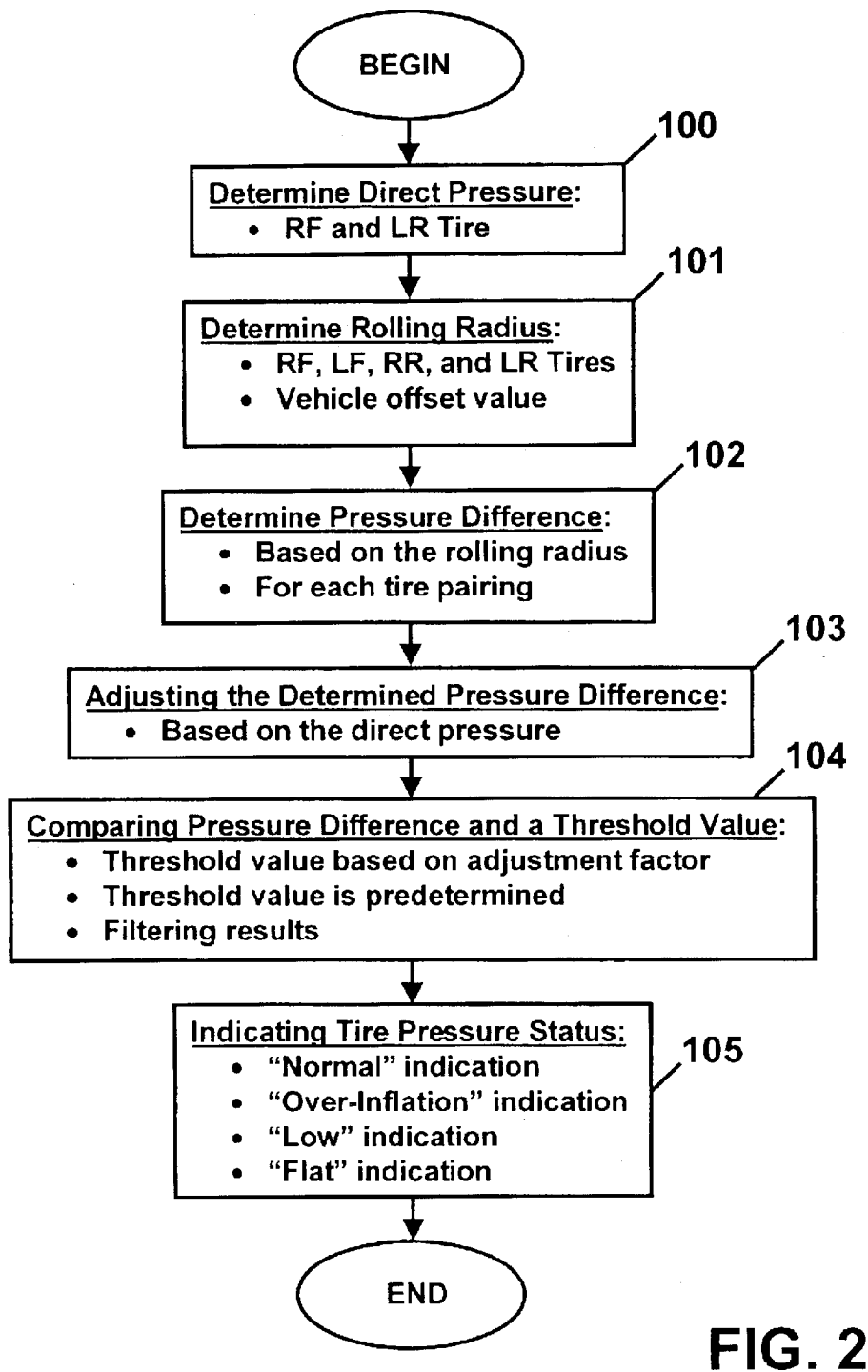
FIG. 2 is a block diagram representing a method of monitoring inflation in a plurality of vehicle tires in accordance with the present invention.

Referring also now to FIG. 2, a method of monitoring inflation in a plurality of vehicle tires is shown in accordance with one embodiment of the present invention. The method may begin with the determination of a direct pressure within the right front (RF) 22a and left rear (LR) 22d tires (step 100). The sensors 34a, 34d may sense direct pressure and the resulting output signals 36a, 36d sent to the controller 40 for determining the direct pressure for the tires 22a, 22d. Direct pressure determinations using pressure sensors are known to one skilled in the art and may be performed, for example, as required per application (e.g., from several times per second to once every few minutes). Should the controller 40 determine an "abnormal" tire inflation status from the direct pressure sensors, the method of the present invention may be interrupted at virtually any step and the "abnormal" tire status may be indicated in a manner later described.

It is important to note that the direct pressure determination need not occur specifically in the right front and left rear tires 22a, 22d. Those skilled in the art will recognize that the direct pressure determination(s) may be made in the other tires and other tire combinations while providing effective tire inflation monitoring in accordance with the present invention.

A rolling radius may be determined for each tire: the right front (RF) 22a, left front (LF) 22b, right rear (RR) 22c, and left rear (LR) 22d tires (step 101). The sensors 30a, 30b, 30c, 30d may sense rotation and the resulting output signals 32a, 32b, 32c, 32d sent to the controller 40 for determining a rolling radius for the tires 22a, 22b, 22c, 22d. Rolling radius determinations using rotation sensors are known to one skilled in the art and may be performed, for example, as required per application (e.g., from several times per second to once every few minutes). Such determinations may include converting a variable frequency sensor output signal 32a, 32b, 32c, 32d, which is directly related the rotational speed of the tire 22a, 22b, 22c, 22d.

One or more offset values reflective of vehicle 10 behavior (e.g., tire wear rate, tire manufacturing tolerances, vehicle weight, tire temperature, etc.) may be provided to allow more reliable and accurate rolling radius determinations. As previously described, various external factors may bias the rolling radius determinations. The offset values may reduce inherent bias and therefore provide a more robust determination of rolling radius. An example of a strategy for determining rolling radius that accounts for such external factors is provided by U.S. Pat. No. 5,218,862 issued to Hurrell, II et al. The offset values may be determined over a predetermined period of time, typically from 30 minutes to an hour of driving, as know in the art. The offset values may be stored in the controller memory portion 48, re-learned or modified as necessary, and recalled when required.

The determined rolling radius is then used to determine a pressure difference for tire 22a, 22b, 22c, 22d pairs (step 102). In one embodiment, the pressure difference may be determined by comparing the rolling radius of a given tire 22a, 22b, 22c, 22d to its axle 12, 14 pairing. For example, a pressure difference may be determined between the right and left front tires 22a, 22b or between the right and left rear tires 22c, 22d. In the aforementioned embodiment wherein the vehicle includes only one tire pressure sensor, the pressure difference may be determined by comparing the rolling radius of the tire including the pressure sensor to any tire not including the pressure sensor. For example, three separate pressure differences may be determined between a right front tire that includes the tire pressure sensor and the left front, right rear, and left rear tires, each of which may not include a pressure sensor.

Any significant pressure differences detected in a given tire pair may indicate that one of tires 22a, 22b, 22c, 22d is improperly inflated. Should there be little or no significant tire pressure difference detected, it may indicate that both tires of the tire pairing are either A) both properly inflated or B) both improperly inflated. To determine which the case is, the determined pressure difference may require adjustment.

The determined pressure difference is then adjusted (step 103). The adjustment is based on previously determined direct tire 22a, 22d pressures. For example, the direct pressure information for the front right tire 22a obtained with pressure sensor 34a can be used to calibrate the determined pressure difference with the front left tire 22b without a pressure sensor. In the case where there is little or no significant tire pressure difference detected, an adjusted pressure difference provides means for accurately assessing if the tire pair is properly or improperly inflated.

The adjustment provides a "hybrid" strategy (i.e., by combining rolling radius and direct pressure determinations) for overcoming many of the inherent biases and shortcoming associated with tire inflation models based strictly on rolling radius determinations. For example, inflation models based on rolling radius determinations may not provide accurate monitoring for situations where all four tires of a vehicle are under-inflated. The present invention, however, provides a strategy for accurately monitoring tire pressure in this and other situations. In addition, accurate pressure values may be obtained with the present invention for a given tire 22a, 22b, 22c, 22d pair with only one pressure sensor 34a, 34d thereby reducing cost and complexity of the inflation monitoring system 20.

Figure 3:
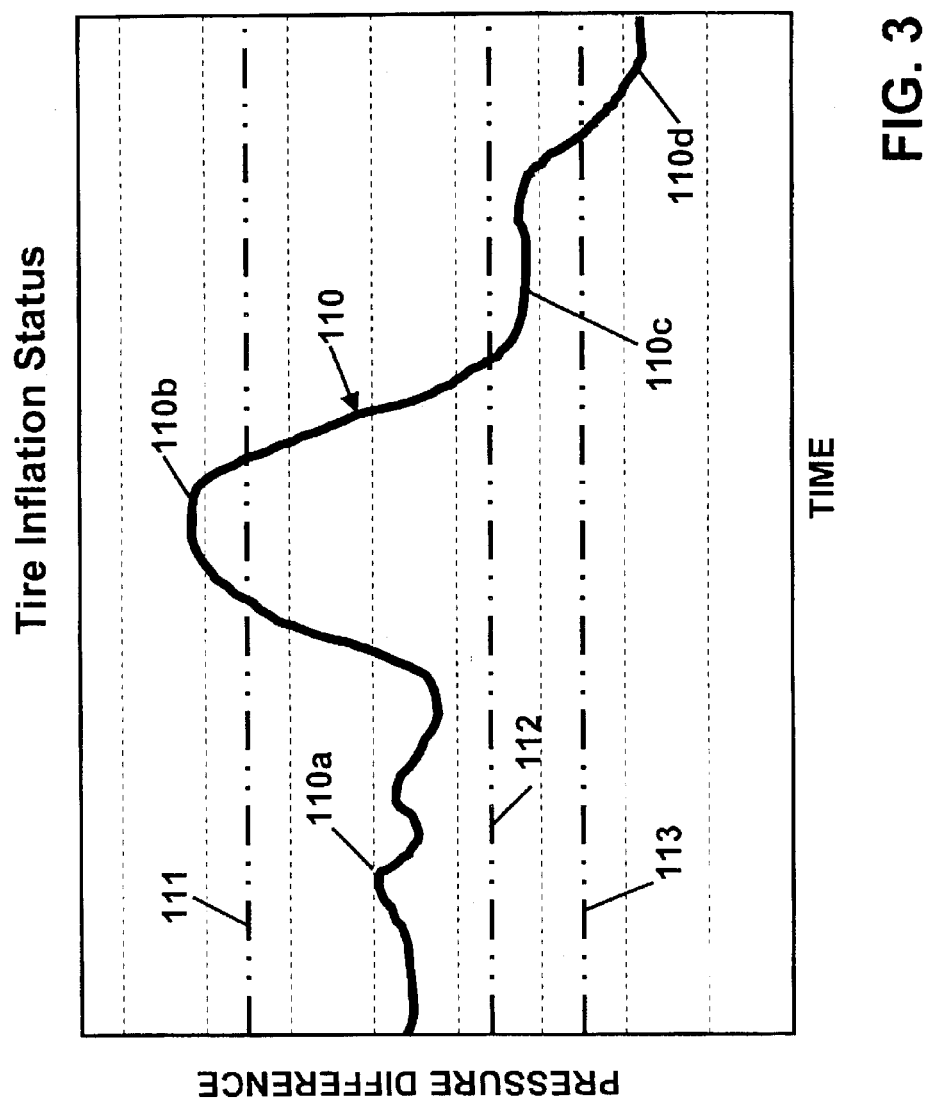
FIG. 3 is a graph depicting a representative time history of tire inflation status for the vehicle of FIG. 1.

Once adjusted, the determined pressure difference may be compared to at least one threshold value (step 104). As shown in FIG. 3, a representative adjusted determined pressure difference 110 is plotted over time. The pressure difference 110 may be considered "normal" 110a when between upper 111 and lower 112 threshold values. Alternatively, the pressure difference 110 may be considered "over-inflated" 110b when greater than the upper 111 threshold value and may be considered "low" 110c when less than the lower 112 threshold value. The pressure difference 110 may be considered "flat" 110d when less than the lower 112 and flat 113 thresholds.

In one embodiment, the threshold values 111, 112, 113 may be programmed within the microprocessor memory portion 48. The threshold values 111, 112, 113 may be predetermined and/or adjusted with one or more adjustment factors. The adjustment factors may be provided to compensate for numerous conditions or elements. For example, the adjustment factor may be used to account for various vehicle applications, tire brand and types, road conditions, and the like.

In one embodiment, results of the comparison of the pressure difference to threshold value(s) may be indicated (step 105) as shown in FIG. 4 by, for example, the vehicle indicator. When the tire inflation status is determined to be within a predetermined normal pressure range, the indicator may indicate a "normal" status 150. When the tire inflation status is "abnormal" and is above a predetermined normal pressure range, the indicator may indicate an "over-inflated" status 151. Likewise, when the tire inflation status is "abnormal" and below or far below a predetermined normal pressure range, the indicator may indicate a "low" 152 or "flat" 153 status, respectively.

In another or the same embodiment, the vehicle indicator may indicate various outputs indicative of tire inflation status. For example, the vehicle indicator may include a display (e.g., digital or analog) of the determined or estimated tire pressure for each individual tire (e.g., in psi). The tire pressure for a given tire may be determined from the direct pressure determinations (i.e., for tires including a pressure sensor) or estimated from the adjusted tire pressure difference determinations (i.e., for tires not including a pressure sensor). The vehicle indicator may optionally include means, such as a display color change, an audible signal, and the like, for indicating when the tire pressure is "abnormal". Those skilled in the art will recognize that the threshold value, number, method of determination and comparison to the pressure difference, and indication strategy may vary while providing accurate and effective tire inflation monitoring consistent with the present invention.

Regardless of the strategy for monitoring tire inflation status, numerous factors may confound the determinations and comparisons associated therewith. For example, the vehicle may encounter transient conditions, such as an extremely bumpy road, that may bias the direct pressure and/or rolling radius determinations. Various filtering strategies may be used in conjunction with the present invention to minimize the confounding effects of these factors (step 104). Such filters are known in the art and may be programmed as an algorithm and implemented from the controller 40 during, for example, the comparison of the determined pressure difference to the threshold value(s).

While the embodiments of the invention disclosed herein are presently considered to be preferred, various changes and modifications may be made without departing from the spirit and scope of the invention. For example, the tire inflation monitoring system and the method and programmed algorithm of operation are not limited to any particular design or sequence. Specifically, the controller, indicator, tire, axle, and sensor configuration and number may vary without limiting the utility of the invention. Furthermore, the method and tire inflation monitoring algorithm may include optional steps, variations in step order and timing, and may be achieved by various strategies.

Upon reading the specification and reviewing the drawings hereof, it will become immediately obvious to those skilled in the art that myriad other embodiments of the present invention are possible, and that such embodiments are contemplated and fall within the scope of the presently claimed invention. The scope of the invention is indicated in the appended claims, and all changes that come within the meaning and range of equivalents are intended to be embraced therein.

What is claimed is:

1. A method of monitoring inflation in a plurality of vehicle tires, the method comprising:
   determining a direct pressure in at least one primary tire;
   determining a rolling radius for the primary tire and at least one secondary tire;
   determining a pressure difference based on the determined rolling radius for the primary and secondary tires;
   adjusting the determined pressure difference based on the determined direct pressure of the primary tire; and
   comparing the determined pressure difference to at least one threshold value.

2. The method of claim 1 wherein the rolling radius is determined based on at least one offset value.

3. The method of claim 1 wherein the pressure difference is determined for a plurality of tire pairs.

4. The method of claim 1 wherein the threshold value is determined based on at least one adjustment factor.

5. The method of claim 1 wherein the threshold value is predetermined.

6. The method of claim 1 further comprising filtering results of the comparison of the pressure difference to the threshold value.

7. The method of claim 1 further comprising indicating a tire inflation status based on the comparison of the pressure difference to the threshold value.

8. The method of claim 7 wherein the tire inflation status comprises an indication selected from a group consisting of a low tire pressure, a flat tire pressure, a high tire pressure, and a normal tire pressure.

9. A computer usable medium including a program for monitoring inflation in a plurality of vehicle tires, the computer usable medium comprising:
   computer readable program code for determining a direct pressure from a signal in at least one primary tire;
   computer readable program code for determining a rolling radius for the primary tire and at least one secondary tire;
   computer readable program code for determining a pressure difference based on the determined rolling radius for the primary and secondary tires;
   computer readable program code for adjusting the determined pressure difference based on the determined direct pressure of the primary tire; and
   computer readable program code for comparing the determined pressure difference to at least one threshold value.

10. The computer usable medium of claim 9 wherein the rolling radius is determined based an at least one offset value.

11. The computer usable medium of claim 9 wherein the pressure difference is determined for a plurality of tire pairs.

12. The computer usable medium of claim 9 wherein the threshold value is determined based on at least one adjustment factor.

13. The computer usable medium of claim 9 wherein the threshold value is predetermined.

14. The computer usable medium of claim 9 further comprising computer readable program code for filtering results of the comparison of the pressure difference to the threshold value.

15. The computer usable medium of claim 9 further comprising computer readable program code for indicating a tire inflation status based on the comparison of the pressure difference to the threshold value.

16. The computer usable medium of claim 15 wherein the tire inflation status comprises an indication selected from a group consisting of a low tire pressure, a flat tire pressure, a high tire pressure, and a normal tire pressure.

17. A system for monitoring inflation in a plurality of vehicle tires, the system comprising:
   means for determining a direct pressure in at least one primary tire;
   means for determining a rolling radius for the primary tire and at least one secondary tire; and
   means for determining a pressure difference based on the determined rolling radius for the primary and secondary tires, wherein the determined pressure difference is adjusted based on the determined direct pressure of the primary tire, and the determined pressure difference is compared to at least one threshold value.

18. The system of claim 17 further comprising means for filtering the comparison of the determined pressure difference to the threshold value.

19. The system of claim 17 further comprising means for indicating a tire pressure status based on the comparison of the pressure difference to the determined threshold value.

20. The system of claim 19 wherein the tire pressure status comprises an indication selected from a group consisting of a low tire pressure, a flat tire pressure, a high tire pressure, and a normal tire pressure.

* * * * *